United States Patent
Powell

(10) Patent No.: US 7,308,453 B2
(45) Date of Patent: Dec. 11, 2007

(54) META-DATA APPROACH TO INDEXING, RETRIEVAL AND MANAGEMENT OF STORED MESSAGES IN A PORTABLE COMMUNICATION DEVICE

(75) Inventor: Matthew S. Powell, Perth (AU)

(73) Assignee: Nokia Corporation

(*) Notice: Subject to any disclaimer, the term of this patent is extended or adjusted under 35 U.S.C. 154(b) by 505 days.

(21) Appl. No.: 10/880,356

(22) Filed: Jun. 29, 2004

(65) Prior Publication Data
US 2005/0289190 A1    Dec. 29, 2005

(51) Int. Cl.
*G06F 17/30* (2006.01)
(52) U.S. Cl. ............................................. 707/100; 707/3
(58) Field of Classification Search ................ 707/100, 707/1, 3, 7, 101, 103, 104.1
See application file for complete search history.

(56) References Cited

U.S. PATENT DOCUMENTS

| | | | |
|---|---|---|---|
| 6,505,205 B1 * | 1/2003 | Kothuri et al. ............. | 707/100 |
| 2001/0030662 A1 * | 10/2001 | Ohkawa et al. ............. | 345/764 |
| 2002/0059210 A1 * | 5/2002 | Makus et al. ............... | 707/3 |
| 2005/0033780 A1 | 2/2005 | Simelius et al. | |
| 2005/0050043 A1 | 3/2005 | Pyhalammi et al. | |
| 2006/0101041 A1 * | 5/2006 | Agarwal et al. ............ | 707/100 |

OTHER PUBLICATIONS

Outlook Spam Filter, "Get rid fo spam, but never lose an important email", from the Internet.
Personal Technology, "Adobe Photo software Now Makes it East to Create Albums", W. Mossberg, Jan. 22, 2004, from the Internet.
Internet Draft P-IMAP, The Push-IMAP Protocol (P-IMAP), S. Maes et al, Mar. 2004, from the Internet.

* cited by examiner

Primary Examiner—Chong H Kim

(57) ABSTRACT

This invention describes a method for indexing, retrieval and managing of stored messages using a meta-data approach in a portable communication device such as a mobile electronic device or a mobile phone. Main implementation stages to achieve this can include (but are not limited to): calculating and storing of meta-data for a new message when the new message is received; indexing of all messages into all supported hierarchies using their meta-data; and using a user interface to facilitate displaying supported hierarchies and retrieving desired messages. The invention idea is to store all the desired meta-data related to every message stored in the message storage area of the portable communication device and to provide dynamic capabilities for indexing said meta-data into existing and possibly newly created hierarchies and to provide a fast retrieval of the messages by effectively managing said hierarchies.

24 Claims, 2 Drawing Sheets

META-DATA APPROACH TO INDEXING, RETRIEVAL AND MANAGEMENT OF STORED MESSAGES IN A PORTABLE COMMUNICATION DEVICE

TECHNICAL FIELD

This invention generally relates to a message management and more specifically to meta-data approach for indexing, retrieval and managing of stored messages in a portable communication device.

BACKGROUND ART

When messages are stored in large memory areas (such as memory cards or a large memory in a mobile device) it is very common for users to have hundreds of messages in their inbox. It is very tiresome to find old messages or sort for those that are wanted and those that can be discarded. With the tremendous popularity growth in SMS (short message service), MMS (multimedia-messaging service) and shared inbox with e-mail, the number of messages the user wants to keep grows very rapidly in today's world of intense communications. Storing and sorting these messages on currently available devices, especially portable communication devices with severe size and weight restrictions, is difficult and represents a significant challenge.

In a data warehousing/mining world, large amounts of data are stored into multi-dimensional databases that support many views into the data, organized into hierarchies. It is certainly overkill to create a multi-dimensional database for the scale of storage of messages in the portable communication devices such as mobile electronic devices and mobile phones but similar approaches can be used to optimize views and searches along pre-defined hierarchies.

DISCLOSURE OF THE INVENTION

The object of the present invention is to provide a novel method for indexing, retrieval and managing of stored messages using a meta-data approach in a portable communication device such as a mobile electronic device or a mobile phone.

According to a first aspect of the invention, a method of indexing, retrieval and managing of stored messages using a meta-data approach in a portable communication device comprises the steps of: receiving a new message signal containing a new message and storing the new message with an assigned identifier in a message storage area of the portable communication device along with N previously received and stored messages with corresponding N identifiers; determining meta-data for the new message and storing the meta-data by a meta-data determining storage module of the portable communication device; and performing indexing of the meta-data and adding the indexing to M existing index hierarchies by an index determination and storage module of the portable communication device, the M existing index hierarchies are pre-defined for the portable communication device and the N previously received and stored messages are indexed in the M existing index hierarchies using their corresponding meta-data by the index determination and storage module, thus facilitating effective retrieval and management of the N+1 stored messages by a user based on the M index hierarchies and the N+1 identifiers, wherein N is zero or an integer of at least a value of one and M is an integer of at least a value of one.

According further to the first aspect of the invention, after the step of determining the meta-data, the method may further comprise the step of: sending the meta-data for the new message with the identifier of the new message to the index determination and storage module.

Further according to the first aspect of the invention, after the step of receiving the new message signal, the method may further comprise the steps of: determining by the user whether the new message is to be stored in the message storage area and not to be erased from the message storage area; and providing a new message/identifier signal containing the new message with the identifier from the message storage area to the meta-data determining storage module if it is determined that the new message is needed to be stored in the message storage area and is not erased.

Still further according to the first aspect of the invention, after the step of determining the meta-data, the method may further comprise the steps of: determining whether the user desires to add for storing further meta-data related to the new message to the meta-data determining storage module; and adding for storing the further meta-data related to the new message to the meta-data determining storage module if it is determined that the user desires to add and store the further meta-data. Further, if the user desires to add and store the further meta-data related to the new message, the method may further comprises the step of: providing the meta-data and further meta-data for the new message with the identifier of the new message to the index determination and storage module and optionally store the meta-data and the further meta-data in the index determination and storage module, wherein the step of performing the indexing is performed for the meta-data and for the further meta-data combined. Still further, after the step of determining the meta-data, the method may further comprise the steps of: determining whether the user desires to add for storing still further meta-data related to the new message to the meta-data determining storage module or determining whether the user desires to remove previously stored meta-data related to the new message from the meta-data determining storage module; adding for storing the still further meta-data related to the new message to the meta-data determining storage module if it is determined that the user desires to add and store the further meta-data; and optionally deleting the previously stored meta-data related to the new message from the meta-data determining storage module, if it is determined that the user desires to remove the previously stored meta-data related to the new message. Yet still further, if the user adds and stores the still further meta-data related to the new message or if the user optionally removes previously stored meta-data related to the new message, the method may further comprise the step of: sending all currently stored meta-data for the new message with the identifier of the new message to the index determination and storage module and optionally store the currently stored meta-data in the index determination and storage module, wherein the step of performing the indexing is performed for the currently stored meta-data.

According further to the first aspect of the invention, the method may further comprise the step of: entering and managing by the user a desired hierarchy within the M existing index hierarchies for the N+1 messages and optionally retrieving any desired message of the N+1 messages within the M existing index hierarchies in response to a hierarchy/message retrieval request signal provided to the index determination and storage module.

According still further to the first aspect of the invention, the method may further comprise the steps of: determining whether the user desires to add a new hierarchy to the index determination and storage module or optionally determining whether the user desires to remove a previously existing hierarchy of the M existing index hierarchies from the index determination and storage module; adding, if it is determined that the user desires to add the new hierarchy, the new hierarchy to the index determination and storage module by the user and performing re-indexing of the new hierarchy by the index determination and storage module for all meta-data for the N+1 stored messages with the N+1 identifiers and adding the new hierarchy to the M existing index hierarchies; and deleting the previously existing hierarchy from the index determination and storage module if it is determined that the user desires to remove the previously existing hierarchy.

According further still to the first aspect of the invention, the method may further comprise the step of: deleting a message out of the N+1 messages from the message storage area by the user with further automatic deleting corresponding meta-data related to the deleted message from any block of the portable communication device storing the corresponding meta-data related to the deleted message and modifying the M hierarchies to exclude any references to the corresponding meta-data related to the deleted message.

According yet further still to the first aspect of the invention, the portable communication device may be a mobile electronic device or a mobile phone.

According to a second aspect of the invention, a portable communication device for indexing, retrieval and managing of stored messages using a meta-data approach comprises: a message storage area, responsive to a new message signal containing a new message, for storing the new message with an assigned identifier in a message storage area of the portable communication device along with N previously received and stored messages with corresponding N identifiers; a meta-data determining storage module, for determining meta-data for the new message and storing the meta-data; and an index determination and storage module, for indexing of the meta-data and adding the indexing to M existing index hierarchies, the M existing index hierarchies are pre-defined for the portable communication device and the N previously received and stored messages are indexed in the M existing index hierarchies using their corresponding meta-data by the index determination and storage module, thus facilitating effective retrieval and management of the N+1 stored messages by a user based on the M index hierarchies and the N+1 identifiers, wherein N is zero or an integer of at least a value of one and M is an integer of at least value of one.

According further to the second aspect of the invention, after determining the meta-data, the meta-data determining storage module may provide the meta-data for the new message with the identifier of the new message to the index determination and storage module.

Further according to the second aspect of the invention, after receiving the new message signal, the message storage area may provide the new message/identifier signal containing the new message with the identifier to the meta-data determining storage module.

Still further according to the second aspect of the invention, after determining the meta-data, a further meta-data related to the new message may be optionally added to the meta-data determining storage module by the user. Further, the meta-data and further meta-data for the new message with the identifier of the new message may be provided to and optionally stored in the index determination and storage module, wherein the indexing may be performed by the index determination and storage module for the meta-data and the further meta-data combined. Still further, a still further meta-data related to the new message may be optionally added to the meta-data determining storage module by the user and previously stored meta-data related to the new message from the meta-data determining storage module may be optionally deleted from the meta-data determining storage module by the user. Yet still further, after the optional addition and optional deletion, all combined meta-data currently stored in the meta-data determining storage module for the new message with the identifier of the new message may be provided to and optionally stored in the index determination and storage module, wherein the indexing may be performed by the index determination and storage module for the all combined meta-data.

According further to the second aspect of the invention, a desired hierarchy within the M existing index hierarchies for the N+1 messages may be entered and managed and any desired message of the N+1 messages within the M existing index hierarchies may be optionally retrieved in response to a hierarchy/message retrieval request signal provided to the index determination and storage module by the user.

According still further to the second aspect of the invention, a new hierarchy may be added to the index determination and storage module by the user and re-indexing of the new hierarchy may be performed by the index determination and storage module for all meta-data corresponding to the N+1 stored messages with the N+1 identifiers and adding the new hierarchy to the M existing index hierarchies, or optionally a previously existing hierarchy may be deleted from the index determination and storage module.

According further still to the second aspect of the invention, the user may delete a message out of the N+1 messages from the message storage area with automatic further deleting corresponding meta-data related to the deleted message from any block of the portable communication device storing the corresponding meta-data related to the deleted message and modifying the M hierarchies to exclude any references to the corresponding meta-data related to the deleted message.

According yet further still to the second aspect of the invention, the portable communication device may be a mobile electronic device or a mobile phone.

According to a third aspect of the invention, a computer program product comprising: a computer readable storage structure embodying computer program code thereon for execution by a computer processor with the computer program code, characterized in that it includes instructions for performing the steps of the first aspect of the invention indicated as being performed by the portable communication device.

Summarizing, the advantages of the present invention include (but are not limited to): significantly improving messaging inbox capabilities makes it easier to delete, sort and organize messages when the number of messages is larger than approximately 20 and speeding up messaging access using regular indexing.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a new methodology for indexing, retrieval and managing of stored messages using a meta-data approach in a portable communication device such as a mobile electronic device or a mobile phone. The main implementation stages performed by the portable communication device to facilitate this methodology can include (but are not limited to):

1) Calculating and storing of meta-data for a new message when the new message is received;

2) Indexing of messages into all supported hierarchies;

3) Messaging UI (user interface) support for displaying supported hierarchies.

The invention idea is to store all the desired meta-data (which is automatically created for any new message and can be actively altered by a user of the portable communication device at any time) related to every message stored in the message storage area of the portable communication device and to provide dynamic capabilities for indexing said meta-data into existing and possibly newly created hierarchies and to provide a fast retrieval of the messages by effectively managing said hierarchies.

Figure 1:
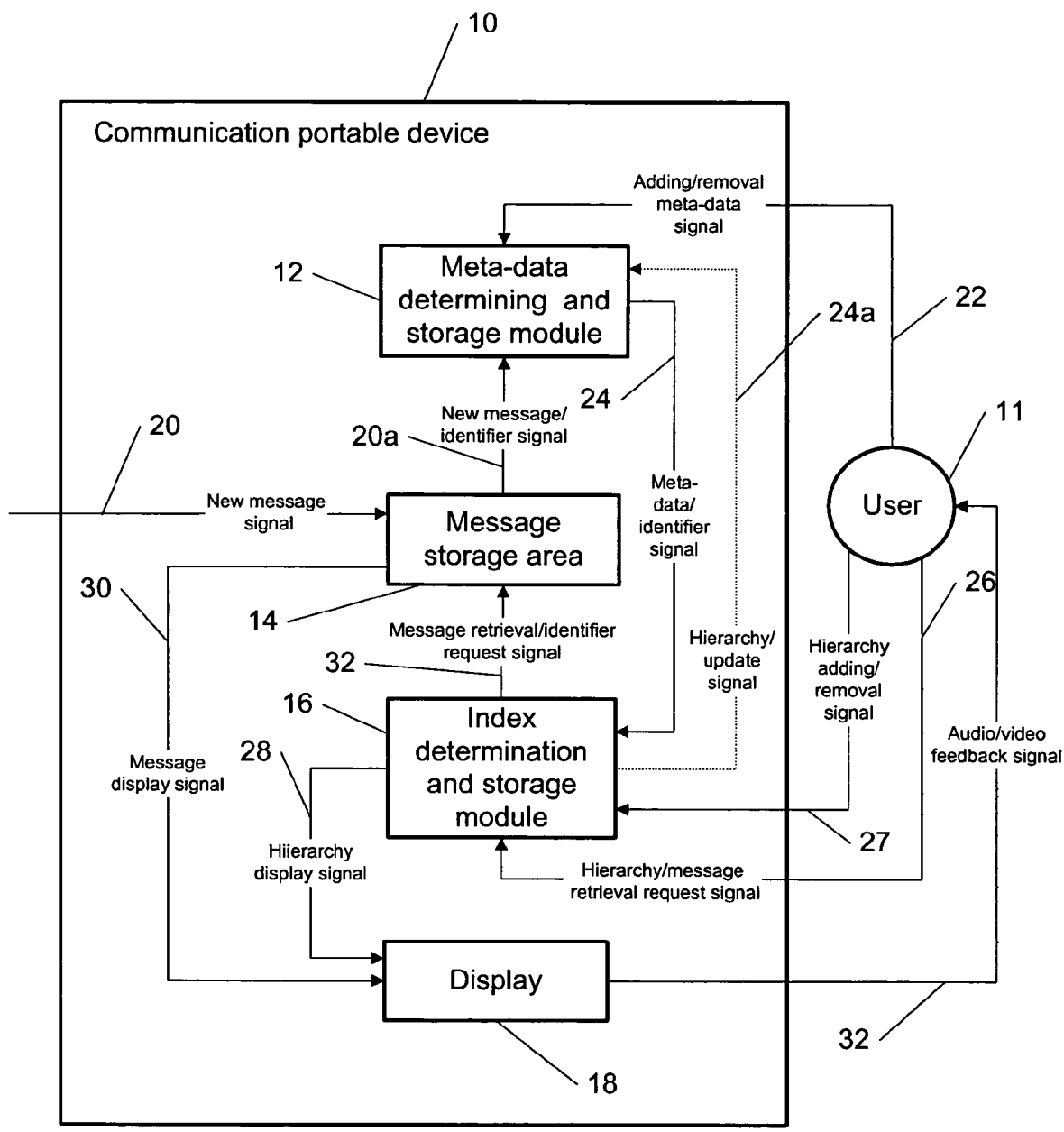
FIG. 1 shows an example of a block diagram of a portable communication device for indexing, retrieval and managing of stored messages using a meta-data approach, according to the present invention.

FIG. 1 shows one example among many others of a block diagram of a portable communication device 10 for indexing, retrieval and managing of stored messages using a meta-data approach, according to the present invention.

When a new message (a new message signal 20) is received by the portable communication device 10, this new message is stored in a message storage area 14 with an assigned identifier along with N previously received and stored messages with corresponding N identifiers (N is zero or an integer of at least a value of one). At this point several variations are possible. In one scenario, the message storage area 14 automatically provides a new message/identifier signal 20a containing said new message with said identifier to a meta-data determining storage module 12. In an alternative scenario, signal 20a is provided to the meta-data determining storage module 12 only if it is determined that the new message is to be stored in the message storage area 14 and not erased, e.g., after a user 11 reads the new message by viewing it on a display 18 (using a message display signal 30) and decides to save it by closing said message without erasing.

Upon receiving the new message, the meta-data determining storage module 12 automatically determines and stores all desired meta-data of said new message for supporting all existing index hierarchies. Information on the desired meta-data for supporting said existing index hierarchies is available in the meta-data determining storage module 12 and can be updated by a hierarchy update signal 25 from an index determination and storage module 16, if there are some changes in the hierarchy structure as implemented by the user 11 (as discussed below).

Moreover, it can also be possible for the user 11 to add a further (user related) meta-data (this can be, e.g., a "priority" of the message) related to the new message or to any message out of said N previously stored messages. Similarly, the user 11 can delete selectively (e.g., remove added "priority") previously stored meta-data (i.e., partial meta-data) related to the new message or to any message out of said N previously stored messages or related to all N previously stored messages. Said additions and deletions of the meta-data can be accomplished using an adding/removing meta-data signal 22 provided to the meta-data determining storage module 12 by the user 11 via the messaging UI (user interface) not shown in FIG. 1.

The examples of the automatically determined meta-data are given below:

Time: Year, Month, Day;
Originator: Source, Group, Sender (group looked up from contacts DB (data base) if available, otherwise <no group> or something similar);
Attachment type;
Message size;
Priority.

The meta-data is linked to the message via its identifier (described above) and said identifier can be used to look up for the meta-data when performing indexing, hierarchy management and message retrieval as described below.

Furthermore, the meta-data or all currently stored meta-data (if the user 11 chooses to add the further meta-data or delete the previously stored meta-data) with the identifier of said new message stored in the meta-data determining storage module 12 is sent to the index determination and storage module 16 via a meta-data/identifier signal 24 and optionally stored in the index determination and storage module 16. The signal 24, containing meta-data/identifier related to any of said N+1 messages (the new message or any of said N previously existing messages), can be sent every time after the adding/deletion of meta-data for any of the N+1 messages is implemented by the user 11, as discussed above.

Yet as an alternative implementation, according to the present invention, said adding/deletion of the meta-data for any of the N+1 messages implemented by the user 11 can be implemented by providing (sending) the adding/removing meta-data signal 22 directly to the index determination and storage module 16, if all the meta-data (provided by the signal 24) is stored in the index determination and storage module 16.

The index determination and storage module 16 performs indexing of the meta-data (or all currently stored meta-data) for the new message (or for any of said N+1 messages) and adding said indexing to M existing index hierarchies, said M existing index hierarchies are pre-defined for said portable communication device and said N previously received and stored messages are indexed in said M existing index hierarchies using their corresponding meta-data by said index determination and storage module 16.

Several examples of the meta-data organized into the index hierarchies are provided below:

Time Hierarchies:
Year–>Month–>Day–>Messages,
Month–>Day–>Messages,
etc.
Originator Hierarchies:
Group–>Sender–>Messages (Using groups from contacts DB),
Source–>Sender–>Messages (Email, SMS, MMS, etc.),
Source–>Messages,
etc.

Other useful hierarchies/categories can be:
  Attachment type–>Messages (Java, Ringtone, Plain text, Skin ,etc.

Useful single sort (not hierarchical, just sorting the inbox) meta-data can be:
  Size of the message including attachments (useful when cleaning out the inbox to regain memory on the device),
  Read/Unread,
  Priority (e.g., e-mail priority).

It is also noted that, according to the present invention, if the user 11 deletes any message out of said N+1 messages from the message storage area 14, it automatically triggers deleting corresponding meta-data related to said deleted message from any block (e.g., the module 12 and possibly the module 16) of the portable communication device 10 for storing said corresponding meta-data related to said deleted message and modifying said M hierarchies to exclude any references to the corresponding meta-data related to said deleted message.

Furthermore, according to the present invention, a new hierarchy can be added to the index determination and storage module 16 by the user 11, and re-indexing for said new hierarchy is performed by said index determination and storage module 16 for said meta-data for said N+1 stored messages with said N+1 identifiers and adding said new hierarchy to said M existing index hierarchies. A previously existing hierarchy (out of the M existing index hierarchies) can also be deleted from the index determination and storage module 16 by the user 11. For initiating said adding/deleting hierarchy operation, the user 11 provides a hierarchy adding/removal signal 27 to the index determination and storage module 16 (through the UI, not shown in FIG. 1). If the index determination and storage module 16 does not store all the meta-data corresponding to all the N+1 messages, it can optionally request that information (by sending a hierarchy/update signal 24a) from the meta-data determining and storage module 12.

According to the present invention, the user 11 can enter and manage a desired hierarchy within said M existing index hierarchies for said N+1 messages and, if necessary, retrieve (view on the display 18) any desired message of said N+1 messages within said M existing index hierarchies by providing a hierarchy/message retrieval request signal 26 (through the UI, not shown in FIG. 1) to the index determination and storage module 16. Said entering and managing of the desired hierarchy is initiated by a hierarchy/message retrieval request signal 26 provided by the user 11 to the index determination and storage module 16, which, in response to the signal 26, provides a hierarchy display signal 28 to the display 18, so the user 11 can view the desired hierarchy on the display 18. Moreover, said message retrieval is initiated by the user 11 (through the UI, not shown in FIG. 1) by providing a message retrieval/identifier request signal 32 to the message storage area 14 by the index determination and storage module 16 so the desired message (carried by the signal 30) can be viewed by the user 11 on the display 18.

For example, the user 11 can easily change the view presented on the display 18 to see different hierarchies (given, e.g., a user friendly name, like "Views" and optionally switchable in a tabbed view). For example, if the user 11 chooses the "Sender" view the user 11 will see the following:

Colleagues

Friends

Family

Other.

Then selecting "Friends" will cause the UI (utilizing all active index hierarchies described above) to show all the contacts in the group "Friends". It is implementation specific as to whether the UI would show all groups and contacts or only those for which messages currently exist. The next view can be something like:

Timo

Heikki

Matti

Now selecting "Timo" would display all messages the user 11 has from Timo.

Figure 2:
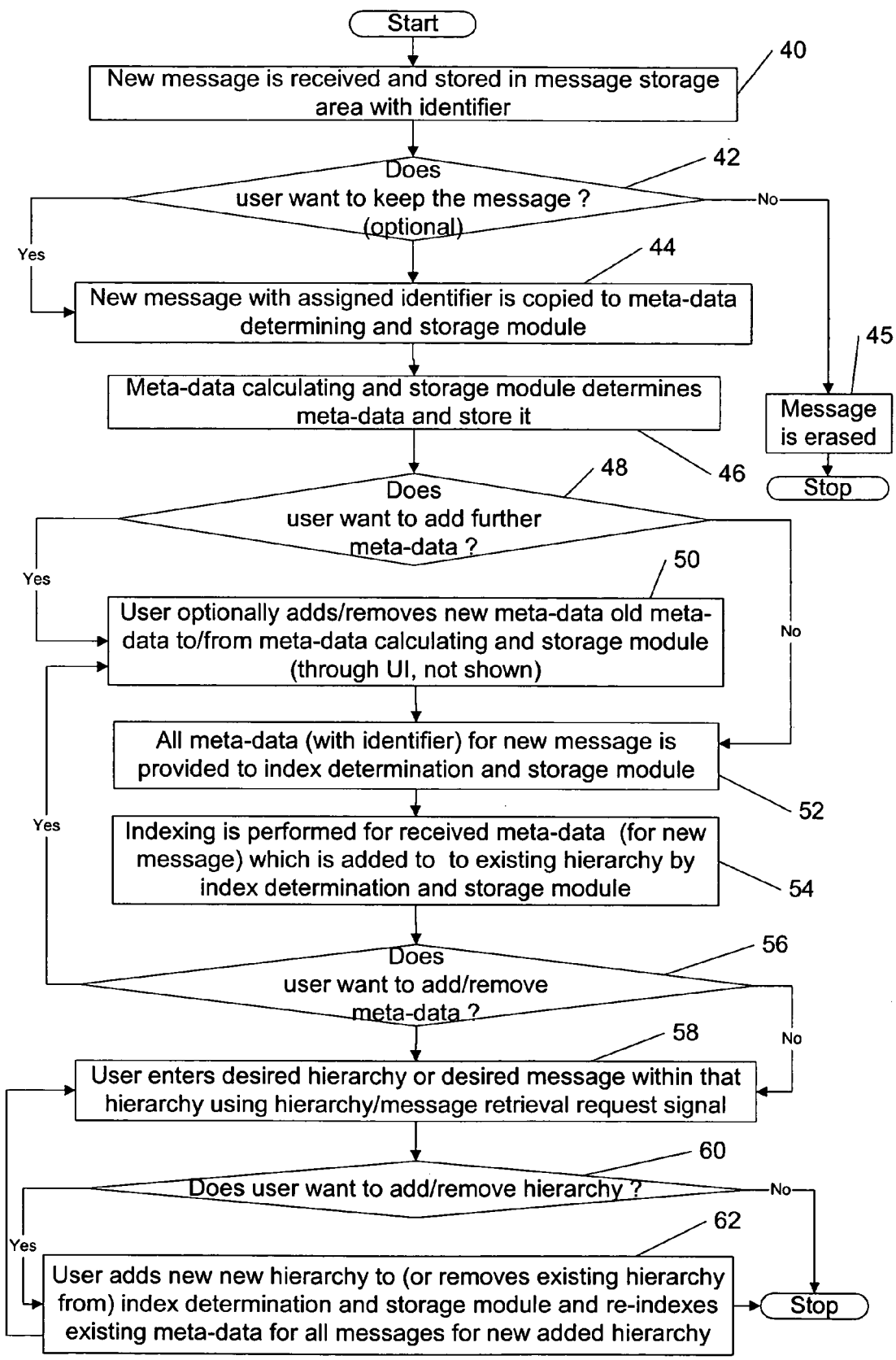
FIG. 2 shows an example of a flow chart demonstrating a performance of a portable communication device for indexing, retrieval and managing of stored messages using a meta-data approach, according to the present invention.

FIG. 2 shows an example of a flow chart demonstrating a performance of the portable communication device 11 for indexing, retrieval and managing of stored messages using the meta-data approach, according to the present invention.

The flow chart of FIG. 2 represents only one possible scenario among many others. In a method according to the present invention, in a first step 40, the new message signal 20 is received by the portable communication device 10 and the new message with the assigned identifier is stored in the message storage area 14 along with N previously received and stored messages with corresponding N identifiers (N is zero or an integer of at least a value of one).

In step 42, it is ascertained whether the user 11 want to keep the new message. As long as that is not the case, in step 45, the new message is erased from the message storage area 14 and the process stops. However, if it is ascertained that the user 11 want to keep the new message, in step 44, said new message with the assigned identifier is copied (automatically) to the meta-data determining and storage module 12. In step 46, the meta-data determining and storage means determines meta-data for said new message and store it. In step 48, it is ascertained whether the user 11 wants to add a further meta-data for said new message. As long as that is not the case, the process goes to step 52. However, if it is ascertained that the user 11 wants to add said further meta-data for said new message, in step 50, the further meta-data is added to the meta-data determining and storage module 12.

In step 52, all (updated) meta-data (in this case including said meta-data and the further meta-data) for the new message is provided (sent) to the index determination and storage module 16. In step 54, indexing is performed for the received meta-data (for new message) by the index determination and storage module 16 which is added to the M existing index hierarchies, (as discussed above, said M existing index hierarchies are pre-defined for said portable communication device 10 and said N previously received and stored messages are indexed in said M existing index hierarchies using their corresponding meta-data by said index determination and storage module 16).

In step 56, it is ascertained whether the user 11 wants to add a still further meta-data or remove any existing meta-data for said new message. As long as that is the case, the process goes to back to step 50. However, if it is ascertained that the user 11 does not want to add said still further meta-data or remove any existing meta-data for said new message, in step 58, the user 11 enters and manages a desired hierarchy within said M existing index hierarchies for said N+1 messages and, if necessary, retrieve any desired message of said N+1 messages within said M existing index hierarchies as described above.

In step 60, it is ascertained whether the user 11 wants to add new/remove old hierarchy. As long as that is not the case, the process stops. However, if it is ascertained that the user 11 wants to add new/remove old hierarchy, in step 62, the user 11 adds the new hierarchy to (or removes existing hierarchy from) the index determination and storage module 16 and re-indexing for said new hierarchy is performed by said index determination and storage module 16 for said meta-data for said N+1 stored messages with said N+1 identifiers, as described above. After completion of step 62, the process can return to step 58 if necessary, or the process can stop.

As explained above, the invention provides both a method and corresponding equipment consisting of various modules providing the functionality for performing the steps of the method. The modules may be implemented as hardware, or may be implemented as software or firmware for execution by a processor. In particular, in the case of firmware or software, the invention can be provided as a computer program product including a computer readable storage structure embodying computer program code, i.e., the software or firmware thereon for execution by a computer processor (e.g., provided with the portable communication device 10).

What is claimed is:

1. A method, comprising:
    receiving a new message signal containing a new message and storing said new message with an assigned identifier in a message storage area of a portable communication device along with N messages received and stored before receiving said new message with corresponding N identifiers;
    determining meta-data for said new message and storing said meta-data by a meta-data determining storage module of said portable communication device; and
    performing indexing of said meta-data and adding said indexing to a plurality of existing index hierarchies by an index determination and storage module of said portable communication device, said plurality of existing index hierarchies are pre-defined for said portable communication device and said N messages are indexed in said plurality of existing index hierarchies using corresponding meta-data for said N messages by said index determination and storage module, for facilitating effective retrieval and management of the N+1 stored messages using said plurality of index hierarchies and said N+1 identifiers, wherein N is zero or an integer of at least a value of one.

2. The method of claim 1, wherein after the determining said meta-data, the method further comprises:
    sending said meta-data for said new message with said identifier of said new message to the index determination and storage module.

3. The method of claim 1, wherein after the receiving said new message signal, the method further comprises:
    determining whether the new message is to be stored in the message storage area and not to be erased from said message storage area; and
    providing a new message/identifier signal containing said new message with said identifier from said message storage area to said meta-data determining storage module if it is determined that the new message is needed to be stored in the message storage area and is not erased.

4. The method of claim 1, wherein after the determining said meta-data, the method further comprises:
    determining whether adding for storing further meta-data related to said new message to the meta-data determining storage module is needed; and
    adding and storing said further meta-data related to said new message to the meta-data determining storage module if it is determined that said determining indicated that said adding and storing said further meta-data related to said new message is needed.

5. The method of claim 4, wherein, if said determining indicated that said adding and storing said further meta-data related to said new message is needed, the method further comprises:
    providing said meta-data and further meta-data for said new message with the identifier of said new message to the index determination and storage module,
    wherein said performing said indexing is performed for the meta-data and for the further meta-data combined.

6. The method of claim 4, wherein after the determining said meta-data, the method further comprises:
    determining whether adding for storing still further meta-data related to said new message to the meta-data determining storage module is needed or determining whether removing all or selected stored meta-data related to said new message from the meta-data determining storage module is needed;
    adding and storing said still further meta-data related to said new message to the meta-data determining storage module if said determining indicated that said adding and storing said further meta-data related to said new message is needed; and
    deleting said all or selected stored meta-data related to said new message from the meta-data determining storage module, if it is determined that said removing said all or selected stored meta-data related to said new message is needed.

7. The method of claim 6, wherein if said still further meta-data related to said new message is added and stored or if said all or selected stored meta-data related to said new message is deleted, the method further comprises:
    sending currently stored meta-data for said new message with the identifier of said new message to the index determination and storage module and store said currently stored meta-data in the index determination and storage module,
    wherein said performing said indexing is performed for said currently stored meta-data.

8. The method of claim 1, further comprising:
    entering and managing a desired hierarchy within said plurality of existing index hierarchies for said N+1 messages and retrieving a desired message of said N+1 messages within said plurality of existing index hierarchies in response to a hierarchy/message retrieval request signal provided to the index determination and storage module.

9. The method of claim 1, further comprising:
    determining whether addition of a new hierarchy to said plurality of existing index hierarchies in the index determination and storage module is needed or determining whether moving hierarchy of said plurality of existing index hierarchies from the index determination and storage module is needed;
    adding, if it is determined that said addition of the new hierarchy is needed, said new hierarchy to the index determination and storage module and performing re-indexing of said new hierarchy by said index determination and storage module for all meta-data for said N+1 stored messages with said N+1 identifiers and adding said new hierarchy to said plurality of existing index hierarchies; and deleting said hierarchy from the index determination and storage module if it is determined that said removing the hierarchy is needed.

10. The method of claim 1, further comprising:
deleting a message out of said N+1 messages from the message storage area by the user with further automatic deleting corresponding meta-data related to said deleted message stored in the portable communication and modifying said plurality of hierarchies to exclude any references to the corresponding meta-data related to said deleted message.

11. The method of claim 1, wherein said portable communication device is a mobile electronic device or a mobile phone.

12. A computer program product comprising: a computer readable storage structure embodying computer program code thereon for execution by a computer processor with said computer program code, wherein said computer program code comprises instructions for performing the method of claim 1, indicated as being performed by the portable communication device.

13. A portable communication device, comprising:
a message storage area, responsive to a new message signal containing a new message, configured to store said new message with an assigned identifier along with N messages received and stored before receiving said new message with corresponding N identifiers;
a meta-data determining storage module, configured to perform determining meta-data for said new message and to store said meta-data; and
an index determination and storage module, configured to perform indexing of said meta-data and to perform adding said indexing to a plurality of existing index hierarchies, said plurality of existing index hierarchies are pre-defined for said portable communication device and said N messages are indexed in said plurality of existing index hierarchies using corresponding meta-data for said N messages, for facilitating effective retrieval and management of the N+1 stored messages using said plurality of index hierarchies and said N+1 identifiers, wherein N is zero or an integer of at least a value of one.

14. The portable communication device of claim 13, wherein after determining said meta-data, said meta-data determining storage module is configured to provide said meta-data for said new message with said identifier of said new message to the index determination and storage module.

15. The portable communication device of claim 13, wherein after receiving said new message signal, said message storage area is configured to provide a new message/identifier signal containing said new message with said identifier to said meta-data determining storage module.

16. The portable communication device of claim 13, wherein after determining said meta-data, a further meta-data related to said new message is added to the meta-data determining storage module by the user.

17. The portable communication device of claim 16, wherein said meta-data and further meta-data for said new message with the identifier of said new message is provided to and stored in the index determination and storage module, and wherein the index determination and storage module is configured to perform said indexing for the meta-data and the further meta-data combined.

18. The portable communication device of claim 16, wherein a still further meta-data related to said new message is added to the meta-data determining storage module or all or selected stored meta-data related to said new message from the meta-data determining storage module is deleted from the meta-data determining storage module.

19. The portable communication device of claim 18, wherein currently stored meta-data in the meta-data determining storage module for said new message with the identifier of said new message is provided to and stored in the index determination and storage module, and wherein the index determination and storage module is configured to perform said indexing for said currently stored meta-data.

20. The portable communication device of claim 13, wherein portable communication device is configured to retrieve a desired message of said N+1 messages within said plurality of existing index hierarchies is in response to a hierarchy/message retrieval request signal provided to the index determination and storage module.

21. The portable communication device of claim 13, wherein a new hierarchy is added to the index determination and storage module said index determination and storage module is configured to perform re-indexing of said new hierarchy for all meta-data corresponding to said N+1 stored messages with said N+1 identifiers and adding said new hierarchy to said plurality of existing index hierarchies, or a previously existing hierarchy is deleted from the index determination and storage module.

22. The portable communication device of claim 13, wherein a message out of said N+1 messages is deleted from the message storage area with automatic further deleting corresponding meta-data related to said deleted message stored in the portable communication device storing said corresponding meta-data related to said deleted message and modifying said plurality of hierarchies to exclude any references to the corresponding meta-data related to said deleted message.

23. A portable communication device, comprising:
means for storing, responsive to a new message signal containing a new message, configured to store said new message with an assigned identifier along with N messages received and stored before receiving said new message with corresponding N identifiers;
means for determining and storing, for determining meta-data for said new message and for storing said meta-data; and
means for indexing of said meta-data and adding said indexing to a plurality of existing index hierarchies, said plurality of existing index hierarchies are pre-defined for said portable communication device and said N messages are indexed in said plurality of existing index hierarchies using corresponding meta-data for said N messages, for facilitating effective retrieval and management of the N+1 stored messages using said plurality of index hierarchies and said N+1 identifiers, wherein N is zero or an integer of at least a value of one.

24. The portable communication of claim 23, wherein said means for storing is a message storage area, said means for determining and storing is a meta-data determining storage module.

* * * * *

UNITED STATES PATENT AND TRADEMARK OFFICE
CERTIFICATE OF CORRECTION

PATENT NO. : 7,308,453 B2 Page 1 of 1
APPLICATION NO. : 10/880356
DATED : December 11, 2007
INVENTOR(S) : Matthew S. Powell It is certified that error appears in the above-identified patent and that said Letters Patent is hereby corrected as shown below:

In column 10, line 26, which is claim 6, "and" should be --for--.

In column 12, line 22, which is claim 21, after "module" --and-- should be inserted.

Signed and Sealed this

Fourth Day of November, 2008

JON W. DUDAS
*Director of the United States Patent and Trademark Office*